United States Patent [19]
Coffman

[11] Patent Number: 6,083,006
[45] Date of Patent: Jul. 4, 2000

[54] PERSONALIZED NUTRITION PLANNING

[76] Inventor: Regina Coffman, 7500 W. Lake Mead Blvd., No. 9-187, Las Vegas, Nev. 89128

[21] Appl. No.: 09/419,658
[22] Filed: Oct. 18, 1999
[51] Int. Cl.⁷ .................................................. G09B 19/00
[52] U.S. Cl. ........................... 434/127; 434/262; 128/921
[58] Field of Search ..................... 434/127, 262; 600/300; 128/920, 921

[56] References Cited

U.S. PATENT DOCUMENTS

| | | | |
|---|---|---|---|
| 4,951,197 | 8/1990 | Mellinger | 128/921 |
| 5,640,774 | 6/1997 | Goldman | 434/127 |
| 5,839,901 | 11/1998 | Karkanen | 128/921 |
| 5,954,640 | 9/1999 | Szabo | 128/921 |
| 5,997,475 | 12/1999 | Bortz | 128/920 |

OTHER PUBLICATIONS

"The Equations Governing Weight Change in Human Beings", by Vincent W. Antonetti, published in The American Journal of Clinical Nutrition, Jan. 1973.

*Primary Examiner*—Sam Rimell
*Attorney, Agent, or Firm*—Leonard Weiss

[57] ABSTRACT

When a person desires a weight change, a daily calorie intake during a diet interval is established from answers that the person provides to questions on a questionnaire. A plan is developed to indicate preferable nutrients that provide the daily calorie intake. The preferable nutrients are included in a food menu that is provided via a computer. The computer additionally provides an indication of whether foods on the menu provide either a deficiency level or a toxicity level of vitamins and minerals.

19 Claims, 3 Drawing Sheets

---

10

QUESTIONNAIRE (The client will answer questions. Their responses will be represented by a variable code. The variable codes will be used for calculation using the unique formula.)

1. Your name _____ (name)
2. How much do you currently weight? _____ (w)
3. Male _____ (xy) Female _____ (xx)
4. How active are you? Select the category that best represents the intensity of work you perform daily:

____ Mostly Sitting (example: computer programmer)
   (S)
   ____ Light Active (example: teacher)
   (L)
   ____ Moderate Active (example: grocery stocker)
   (M)
   ____ Heavy Work (example: roofer)
   (V)

5. Do you know how many calories you eat per day?

____ yes (go to question 6)
   ____ no (go to question 7a)

6. Mark the average number of calories you eat per day: (cc)

1,000 or less ____   2401 - 2600 ____   4001 - 4500 ____
   1001 - 1400 ____     2601 - 2800 ____   4501 - 5000 ____
   1401 - 1800 ____     2801 - 3200 ____   5001 or more ____
   1801 - 2200 ____     3201 - 3600 ____
   2201 - 2400 ____     3601 - 4000 ____

7a. What is your primary goal?

____ Reduce body fat, define & sculpt your shape (go to question 7c)
   ____ Gain weight, increase muscle mass (go to question 7b)
   ____ Dramatic fat reduction in 8 weeks (go to question 7d)
   ____ Maintain your current weight and eat healthier 7b. How many pounds would you like to gain? _____ (mg)
7c. How many pounds would you like to lose? _____ (fl)
7d. How many pounds of fat do you need to lose to get to your goal weight? _____ (fl)

QUESTIONNAIRE

(The client will answer questions. Their responses will be represented by a variable code. The variable codes will be used for calculation using the unique formula.)

1. Your name _____ (name)
2. How much do you currently weight? _____ (w)
3. Male _____ (xy) Female _____ (xx)
4. How active are you? Select the category that best represents the intensity of work you perform daily:

_____ Mostly Sitting (example: computer programmer)
   (S)

_____ Light Active (example: teacher)
   (L)

_____ Moderate Active (example: grocery stocker)
   (M)

_____ Heavy Work (example: roofer)
   (V)

5. Do you know how many calories you eat per day?

_____ yes (go to question 6)
   _____ no (go to question 7a)

6. Mark the average number of calories you eat per day: (cc)

| 1,000 or less _____ | 2401 - 2600 _____ | 4001 - 4500 _____ |
   |---|---|---|
   | 1001 - 1400 _____ | 2601 - 2800 _____ | 4501 - 5000 _____ |
   | 1401 - 1800 _____ | 2801 - 3200 _____ | 5001 or more _____ |
   | 1801 - 2200 _____ | 3201 - 3600 _____ | |
   | 2201 - 2400 _____ | 3601 - 4000 _____ | |

7a. What is your primary goal?

_____ Reduce body fat, define & sculpt your shape (go to question 7c)
   _____ Gain weight, increase muscle mass (go to question 7b)
   _____ Dramatic fat reduction in 8 weeks (go to question 7d)
   _____ Maintain your current weight and eat healthier 7b. How many pounds would you like to gain? _____ (mg)

7c. How many pounds would you like to lose? _____ (fl)

7d. How many pounds of fat do you need to lose to get to your goal weight? _____ (fl)

*FIG. 1*

| Time | Meal | | C | P | F |
|---|---|---|---|---|---|
| 9:00 a.m. | 1 | Flax Oil (1 tbls) | – | – | 15 |
| | | Oatmeal (1/2c. dry) cooked in water | 28 | 5 | 3 |
| | | Cinnamon & Equal to taste | | | |
| | | 1½ scoops Pro Complex protein powder | 1 | 40 | 0 |
| | | 1 TBL MCT oil | | | |
| | | (Immediately following your work-out) | | | |
| 11:00 a.m. | 2 | Fibre One Bran cereal (1/2c.) | 24 | 2 | 0 |
| | | Shredded Wheat N Bran cereal (1/2c.) | 20 | 3 | 0 |
| | | Nonfat Milk (1¼ c.) | 15 | 11 | 0 |
| 1:00 p.m. | 3 | Chicken Breast (5oz.) | | 45 | 4 |
| | | cooked in 1/2 TBL MCT oil | 25 | 4 | 1 |
| | | 3/4 cup corn cooked from frozen kernels | | | |
| | | Salsa or spices for flavor | | | |
| | | Big Green Salad** | | 5 | |
| 3:00 p.m. | 4 | Baked Sweet Potatoes (5oz.) | 35 | – | 1 |
| | | Smuckers Low Sugar Jam (2 TBL) | 10 | 0 | 0 |
| | | Cinnamon & Equal to taste | | | |
| 5:00 p.m. | 5 | Cottage Cheese (Nonfat, 1 c.) | 8 | 32 | 0 |
| | | Fat Free Saltine Crackers (10) | 24 | 4 | 0 |
| 7:00 p.m. | 6 | 1¼ cup egg beaters, 1 whole egg | 4 | 38 | 6 |
| | | scrambled with: | | | |
| | | 1/4 cup Turkey Ham (diced) | – | 4 | 1 |
| | | 1/2 TBL. MCT oil + 1 tsp Olive oil | – | – | 4 |
| TOTAL GRAMS | | | C | P | F |
| +2 TBL MCT oil | | | 192 | 193 | 34 |
| TOTAL CALORIES 2,082 | | | | | |

Baked Red Potatoes (8½ oz.)
Canned Pumpkin (2¼ c.)
Cooked Yams (1½ c./7oz.)
Steamed Brown Rice (1c.)
Cooked Pasta (1½ c.)
Steamed White Rice (1¼ c.)
Cream of Wheat (1½ c.)
5" Corn on the Cob (2½)
Corn kernels (1½ c.)
Corn Tortillas (2½ c.)
Air-popped Popcorn (7c.)

FIG. 2

| Calories | Protein | Carbs. | Fat | Sat. Fat | Mon. Fat | Poly. Fat | Cholest. | Calcium | Iron |
|---|---|---|---|---|---|---|---|---|---|
| 2,082 | 193 | 192 | 34g | 7g | 18.1g | 8.9g | 20mg | 1,500mg | 12mg |

| Magnes. | Phos. | Potass. | Sodium | Zinc | Vit. A | Thiamin | Riboflav. | Niacin | Vit. B6 |
|---|---|---|---|---|---|---|---|---|---|
| 800mg | 1,000mg | 2,500mg | 800mg | 20mg | 5,000iu | 55mg | 55mg | 100mg | 55mg |

| Folic acid | Vit. C | MCT | Fibre | | | | | | |
|---|---|---|---|---|---|---|---|---|---|
| 800mg | 1,100mg | 2 TBL | 6 | | | | | | |

*FIG. 3*

PERSONALIZED NUTRITION PLANNING

BACKGROUND OF THE INVENTION

1. Field of Invention

This invention is in the general field of nutrition planning and, more particularly, is a method of utilizing the power of a computer to generate a diet program.

2. Description of the Prior Art

Many modern diet programs are predicated upon a notion that a desired weight loss from a person's body is accomplished through an indiscriminate reduction of food intake. However, in accordance with modern nutritional science, the indiscriminate reduction of food intake could cause a shrinkage of the body's lean, protein containing, organ and muscle tissue. The shrinkage causes a reduction of energy expended by the body, known as a reduction of basal metabolism.

Because of the reduced metabolism, the body loses only a very small amount of bodyfat—even smaller than a loss attainable by a food intake in accordance with a well planned low calorie diet. The very small loss of bodyfat is a result of what is known as the body's defensive, fat-preserving condition.

In accordance with the explanation given hereinbefore, modern diet programs typically fail because:

1. they are concerned with reduction of weight rather than reduction of bodyfat;
2. they reduce the protein containing organ and muscle tissue that causes the reduction of bodyfat; and
3. there is a rapid loss of weight caused by the shrinkage of the organ and muscle tissue, thereby causing the fat-preserving condition and a slowing of the metabolism.

In summary, the modern diet programs can conceivably make the person fatter; they can also leave the person's immune system repressed by inadequate provision of minerals and vitamins, resulting in the person being susceptible to illness.

Food frequently includes a nutrient known as a carbohydrate. Much of the carbohydrate is changed by the body into glycogen, which is stored in the person's muscles and liver. Glycogen is a fuel used by the body in the expenditure of energy. Glycogen that is not used in the expenditure of energy is converted into bodyfat.

Carbohydrates undergo a biochemical transformation in the body and cause the body to increase levels of a hormone known as insulin. The insulin causes products of the transformation to be stored as bodyfat. Therefore, it is preferable that the body's insulin level remain low. A glycemic index is used to indicate how rapidly a given carbohydrate raises the insulin level. Carbohydrates that are preferred have a low glycemic index.

A hormone known as glucagon is produced by the body. Glucagon causes bodyfat to be broken down by the body and used as an energy source. Increased levels of insulin prevent glucagon production.

Two fatty acids, linoleic acid and linolenic acid, are essential to the body having a healthy skin. The body cannot synthesize the fatty acids. Therefore, it is essential that the well planned diet program include foods that provide the fatty acids.

A change of the person's weight is directly related to a difference between the person's caloric intake and energy expended by the person. Weight is lost when the caloric intake is less than the energy expended. Correspondingly, weight is gained when the caloric intake is greater than the energy expended. Accordingly, at the end of a diet interval, the caloric intake should be only what is required to maintain the person at a desired weight. These are termed "maintenance calories".

Heretofore, the power of a computer has not been used to tailor the diet to the person to reduce bodyfat, maintain a high metabolism, while keeping the person in good health.

SUMMARY OF THE INVENTION

An object of the present invention is a diet program that reduces bodyfat and increases lean muscle.

Another object of the invention is a diet program that meets a person's nutritional needs.

According to a first aspect of the present invention, an estimate is made of a person's current calorie intake and a future calorie intake needed to maintain the person at a desired weight. The current and future calorie intakes are used to compute a recommended calorie intake during a diet interval.

According to the second aspect of the present invention, a computer generates a menu of foods that provide nutrients in desired proportions, with a total calorie value of the foods in accordance with the recommended calorie intake. The computer stores a representation of a group of food items that are nutritionally similar to a food on the menu. The person may substitute one of the items from the group for the food on the menu.

The invention includes computer software that generates a diet program that includes a menu of foods with desired nutrients. The computer is operable change foods on the menu while retaining the desired nutrients.

Other objects, features, and advantages of the invention should be apparent from the following description of the preferred embodiment thereof as illustrated in the accompanying drawing.

BRIEF DESCRIPTION OF THE DRAWING

FIG. 1 is a view of a video screen whereon a questionnaire is displayed;

FIG. 2 is a view of the video screen of FIG. 1 whereon a menu is displayed; and

FIG. 3 is a view of the video screen of FIG. 1 whereon a tabulation of nutrients, vitamins and minerals that are provided by foods on the menu of FIG. 2 are displayed.

DESCRIPTION OF THE PREFERRED EMBODIMENT

A first step in planning a nutrition program for a person is to ascertain the person's physical condition. Elements of the person's physical condition include the person's weight, sex and daily physical activity. Additionally, the person's nutritional objectives and daily food intake are ascertained. Preferably, the physical condition, nutritional objectives and food intake can be determined from the person's answers to questions that are propounded via a questionnaire.

As shown in FIG. 1, the questionnaire is made to appear on a video screen 10 of a computer (not shown). Answers to the questions are interactively entered into a data base of the computer by a computer operator.

A second step of the planning is to ascertain a daily calorie intake for the person, thereby establishing caloric aspects of the program.

A third step of the planning is to indicate nutrients in preferable proportions that provide the daily calorie intake.

A fourth step of the planning is to provide a menu of food that has the nutrients in the preferable proportions.

A fifth step of the planning is to determine whether foods on the menu provide either a deficiency level or a toxicity level of vitamins and minerals.

CALORIC ASPECTS OF THE NUTRITION PROGRAM

Initial Calorie Intake: When the person does not desire a change in weight, the daily calorie intake is substantially equal to energy expended by the person during a day. However, when the person desires a weight change, a starting place for the program is a plan for the daily calorie intake during a diet interval that causes the weight change.

The diet interval starts with the person having a daily calorie intake (referred to hereinafter as $C_s$) that is preferably related to the person's estimated daily calorie intake prior to the diet interval. A relationship between $C_s$ and the estimated daily calorie intake prior to the diet interval is in accordance with Table I which is given as:

TABLE I

| Estimated Daily Calorie Intake Range Prior to the Diet Interval | $C_s$ |
|---|---|
| less than 1000 | 1100 |
| 1001–1400 | 1400 |
| 1401–1800 | 1800 |
| 1801–2200 | 2200 |
| 2201–2400 | 2400 |
| 2401–2600 | 2500 |
| 2601–2800 | 2700 |
| 2801–3200 | 3100 |
| 3201–3600 | 3500 |
| 3601–4000 | 3900 |
| 4000–4500 | 4500 |
| 4501–5000 | 4900 |
| more than 5000 | 0.75 $E_{main}$ |

Where $E_{main}$ is a computed daily calorie intake needed to maintain the person at their weight prior to the diet interval.

Table I is subject to limitations which are given as:

$C_s \leq 0.75\ E_{main}$ when a weight loss is desired; and $E_{main} \geq C_s \geq 0.75\ E_{main}$ when a gain in weight is desired.

When the daily calorie intake range is not known, Table I cannot be used. $C_s$ is then selected in accordance with a relationship which is given as:

$C_s = 0.75\ E_{main}$

Computed daily calorie intake, $E_{main}$, is determined from a relationship which is given as:

$$E_{main} = BMR(1 + K_e) \tag{1}$$

where;
BMR is a minimum amount of energy used by the person per day prior to the diet interval. BMR is referred to as the person's basal metabolism; and
$K_e$ is an activity constant.

The constant, $K_e$, is in a range of 0.4 to 1.0. The low end of the range is applicable when the person is primarily occupied with a sedentary activity, such as typing. The high end of the range is applicable when he person is primarily occupied with a strenuous activity, such as roofing.

BMR is determined from a relationship which is given as:

$$BMR = 24 B_f W_x\ \text{calories} \tag{2}$$

where:
$B_f$ is a constant that is 1.0 for a man and 0.9 for a women; and
$W_x$ is the weight of the person in kilograms prior to the diet interval.

Calorie Intake as the Diet Interval Concludes: During a final week of the diet interval, the person should have a calorie intake that maintains the person at a desired weight. The calorie intake as the diet concludes is in accordance with a relationship which is given as:

$$C_e = BMR_g(1 + K_e) \tag{3}$$

where:
BMR$g$ is the person's basal metabolism when the person is at the desired weight.

Calorie Intake to Cause a Weight Loss

When the person desires the weight loss, the person's daily calorie intake during a thirteen week diet interval is in accordance with Table II which is given as:

TABLE II

| Time | Daily Calorie Intake |
|---|---|
| week 1 | $C_s$ |
| week 2 | $C_s$ |
| week 3 | $C_a + C_s$ where $C_a = (C_e - C_s)/4$ |
| week 4 | $2C_a + C_s$ |
| week 5 | $3C_a + C_s$ |
| week 6 | $4C_a + C_s$ |
| week 7 | $C_e$ |
| week 8 | $0.9 C_e$ |
| week 9 | $0.85 C_e$ |
| week 10 | $0.9 C_e$ |
| week 11 | $0.85 C_e$ |
| week 12 | $0.95 C_e$ |
| week 13 | $C_e$ |

There is an up and down variation in the daily calorie intake from week 8 through week 12 in Table II because a prolonged reduction in daily calorie intake may result in an undesired reduction of the person's metabolism.

CALORIE INTAKE TO CAUSE A WEIGHT GAIN

When the person desires a gain in weight, the person's daily calorie intake during a thirteen week diet interval is in accordance with Table III which is given as:

TABLE III

| Time | Daily Calorie Intake |
|---|---|
| week 1 | $C_s$ |
| week 2 | $C_s$ |
| week 3 | $C_a + C_s$ where $C_a = (C_e - C_s)/4$ |
| week 4 | $2C_a + C_s$ |
| week 5 | $3C_a + C_s$ |
| week 6 | $4C_a + C_s$ |
| week 7 | $C_e$ |
| week 8 | $C_e + 150$ |
| week 9 | $C_e + 300$ |
| week 10 | $C_e + 450$ |
| week 11 | $C_e + 300$ |
| week 12 | $C_e + 150$ |
| week 13 | $C_e$ |

The reason for the up and down variation in the daily calorie intake from week 8 through week 12 in Table III is that a prolonged increase above Ce in daily calorie intake may result in an undesired increase in bodyfat as well as the desired lean muscle increase.

NUTRIENTS THAT PROVIDE THE DAILY CALORIE INTAKE

Principal nutrients of a food intake include protein, fat and carbohydrates which are provided in accordance with nutrient relationships.

Protein: The protein intake in a day is preferably in accordance with protein relationships which are given as:

$Wp=1.5\ W_z$ grams 50 grams$<W_p<$450 grams $C_p=4\ W_p$ where $W_p$ is the weight of the protein intake in grams;
  $C_p$ is the protein intake in calories; and
  $W_z$ is the weight of the person in pounds.

Fat: The fat intake in a day is preferably in accordance with fat relationships which are given as:

$C_f=0.15\ C_t$ $W_f=C_f/9$ grams$<W_f<$100 grams
  where $C_f$ is calories in a daily fat intake;
    $C_t$ is a total daily calorie intake of the person; and
    $W_f$ is grams of said daily fat intake;

Carbohydrates: The amount of carbohydrate intake in a day is preferably in accordance with carbohydrate relationships which are given as:

$C_c=C_t-C_f-C_p$ $W_c=C_c/4$ 75 grams$<W_c<$450 grams
  where $W_c$ is the weight of the carbohydrate intake in grams; and
    $C_c$ is the carbohydrate intake in calories.

EXAMPLE

A women who is moderately active has the goal of maintaining a weight of 125 pounds.
combining the $E_{main}$ relationship of (1) and the BMR relationship of equation (2), $E_{main}=24\ B_f W_X\ (1+K_e)$ for $K_e=0.644$ $B_f=0.9$ $W_x=125/2.2$ kilograms $E_{main}=C_t=2018$ calories $W_p=(1.5)(125)=188$ grams $C_p=(4)(188)=752$ calories $C_f=(0.15)(2018)=303$ calories $W_f=303/9=34$ grams $C_c=2018-752-303=963$ calories $W_c=C_c/4=963/4=241$ grams A tabulation of the nutrients of the example are provided in Table IV which is given as:

TABLE IV

|  | Grams | Calories |
|---|---|---|
| Protein: | 188 | 752 |
| Carbohydrates: | 241 | 963 |
| Fat: | 34 | 303 |
| Total |  | 2018 |

Carbohydrates are known to raise the level of insulin in the body. When a diet is augmented by MCT oil, the amount of calories provided by carbohydrates can be reduced. MCT oil provides calories without raising insulin levels, thereby preventing a reduction of the woman's metabolism.

MCT oil is not processed by the body as a fat. It is for this reason that MCT oil has been established as a separate nutrient.

When MCT oil is used to reduce the carbohydrates in the example, a tabulation of the nutrients is in accordance with Table V which is given as:

TABLE V

|  | Grams | Calories |
|---|---|---|
| Protein: | 188 | 752 |
| Carbohydrates: | 197 | 727 |
| Fat: | 34 | 303 |
| MCT oil: | 2 tablespoons | 236 |
| Total |  | 2018 |

It should be understood that calculation of the nutrients is performed by the computer.

PROVIDING A MENU

The computer is operable to provide a display of one of seven diet menus that have the following classifications:

General Diet
Low Cholesterol Diet
High Antioxidant Diet
High Calcium Diet
Low Sodium Diet
Low Potassium Diet
Vegetarian Diet
Eating On The Go Diet As shown in FIG. 2, when the nutrients in the example have been calculated, the computer is operable to cause the screen 10 to provide a view of a general diet menu 12 of food that provides nutrients in accordance with Table V. The menu 12 includes five meals with two hours between meals. By having the woman eat at least five meals with no more than two hours between meals, the woman's metabolism is increased.

The woman has an option of replacing undesired menu items on the menu 12. When, for example, the undesired menu items are the baked sweet potatoes and the Smucker's low sugar jam, a region 14, where the names of the undesired menu items are displayed, is highlighted. Thereafter, the computer is operable to cause the screen 10 to provide a substitution list 16. Highlighting is well known to those skilled in the art.

The list 16 is arranged in a descending order of nutritional preference. In the case of carbohydrates, food items that have the lowest glycemic index are at the top of the list 16. It should be understood that baked sweet potatoes and Smucker's low sugar jam are carbohydrates. In the case of fats, food items that are lowest in saturated fats are at the top of the list.

In this example, the woman selects the canned pumpkin in a region 18 of the list 16 as a replacement for the undesired menu items. The region 18 is then highlighted. Thereafter, the canned pumpkin is made to appear on the menu 12 in place of the undesired menu items in the highlighted region 14, thereby modifying the menu 12.

When amounts of nutrients of the replacement item are not in the same proportions as the nutrients of the food items in the highlighted region 14, the computer causes an adjustment of the size of portions of foods on the modified menu 12 whereby nutrients are provided in accordance with Table V. Thus, the menu 12 may be changed to accommodate the taste of the woman.

As shown in FIG. 3, the computer is operable to display on the screen 10 a summary table of nutrients, vitamins and minerals provided by foods on the modified menu 12, thereby permitting the woman to learn what vitamins and minerals are provided. Preferably, the summary table provides an indication of whether there is a deficiency or a toxicity of the vitamins and minerals.

I claim:

1. A method of providing a nutrition plan for a person, comprising the steps of:
   estimating the person's daily calorie intake prior to a diet interval;
   recommending a daily calorie intake at the start of said diet interval that is related to said daily calorie intake prior to said diet interval; and
   recommending a daily calorie intake at the conclusion of said diet interval that is in accordance with a relationship which is given as:

$$C_e = BMR_g(1+K_e)$$

where: $C_e$ is said recommended daily calorie intake at the conclusion of said diet interval;
   $BMR_g$ is the person's basal metabolism rate when the person is at a desired weight; and
   $K_e$ is an activity constant in a range of 0.4 to 1, where the low end of the range is applicable when the person is primarily occupied with a sedentary activity and the high end of the range is applicable when the person is primarily occupied with a strenuous activity.

2. In the method of claim 1 when the person desires a change in weight, said step of recommending said starting calorie intake includes the step of determining said starting calorie intake from a table which is given as:

| Estimated Daily Calorie Intake Range Prior to the Diet Interval | $C_s$ |
| --- | --- |
| less than 1000 | 1100 |
| 1001–1400 | 1400 |
| 1401–1800 | 1800 |
| 1801–2200 | 2200 |
| 2201–2400 | 2400 |
| 2401–2600 | 2500 |
| 2601–2800 | 2700 |
| 2801–3200 | 3100 |
| 3201–3600 | 3500 |
| 3601–4000 | 3900 |
| 4000–4500 | 4500 |
| 4501–5000 | 4900 |
| more than 5000 | 0.75 $E_{main}$ |

$E_{main}$ is a computed daily calorie intake needed to maintain the person at their weight prior to said diet interval; and
$C_s$ is said daily calorie intake at the start of said diet interval, subject to limitations which are given as:
$C_s \leq 0.75\ E_{main}$, when the person desires a weight loss; and
$E_{main} \geq C_s \geq 0.75\ E_{main}$, when the person desires a gain in weight.

3. In the method of claim 2 wherein said diet interval is thirteen weeks, the additional step of recommending a daily calorie during said diet interval in accordance with a table which is given as:

| Time | Daily Calorie Intake |
| --- | --- |
| week 1 | $C_s$ |
| week 2 | $C_s$ |
| week 3 | $C_a + C_s$ where $C_a = (C_e - C_s)/4$ |
| week 4 | $2C_a + C_s$ |
| week 5 | $3C_a + C_s$ |
| week 6 | $4C_a + C_s$ |
| week 7 | $C_e$ |
| week 8 | $0.9C_e$ |
| week 9 | $0.85C_e$ |
| week 10 | $0.9C_e$ |
| week 11 | $0.85C_e$ |
| week 12 | $0.95C_e$ |
| week 13 | $C_e$. |

4. In the method of claim 2 wherein said diet interval is thirteen weeks, the additional step of recommending a daily calorie during said diet interval in accordance with a table which is given as:

| Time | Daily Calorie Intake |
| --- | --- |
| week 1 | $C_s$ |
| week 2 | $C_s$ |
| week 3 | $C_a + C_s$ where $C_a = (C_e - C_s)/4$ |
| week 4 | $2C_a + C_s$ |
| week 5 | $3C_a + C_s$ |
| week 6 | $4C_a + C_s$ |
| week 7 | $C_e$ |
| week 8 | $C_e + 150$ |
| week 9 | $C_e + 300$ |
| week 10 | $C_e + 450$ |
| week 11 | $C_e + 300$ |
| week 12 | $C_e + 150$ |
| week 13 | $C_e$. |

5. In the method of claim 1 wherein the daily calorie intake at the start of said diet interval is in accordance with a relationship which is given as:

$$C_s = 0.75 E_{main}$$

where: $C_s$ is the calorie intake at the start of said diet interval: and
$E_{main}$ is a computed daily calorie intake needed to maintain the person at their weight prior to said diet interval.

6. In the method of claim 5 wherein said diet interval is thirteen weeks, the additional step of recommending a daily calorie intake during said diet interval in accordance with a table which is given as:

| Time | Daily Calorie Intake |
| --- | --- |
| week 1 | $C_s$ |
| week 2 | $C_s$ |
| week 3 | $C_a + C_s$ where $C_a = (C_e - C_s)/4$ |
| week 4 | $2C_a + C_s$ |
| week 5 | $3C_a + C_s$ |
| week 6 | $4C_a + C_s$ |
| week 7 | $C_e$ |
| week 8 | $0.9C_e$ |
| week 9 | $0.85C_e$ |
| week 10 | $0.9C_e$ |

-continued

| Time | Daily Calorie Intake |
|---|---|
| week 11 | $0.85 C_e$ |
| week 12 | $0.95 C_e$ |
| week 13 | $C_e$. |

7. In the method of claim 5 wherein said diet interval is thirteen weeks, the additional step of recommending a daily calorie intake during said diet interval in accordance with a table which is given as:

| Time | Daily Calorie Intake |
|---|---|
| week 1 | $C_s$ |
| week 2 | $C_s$ |
| week 3 | $C_a + C_s$ where $C_a = (C_e - C_s)/4$ |
| week 4 | $2C_a + C_s$ |
| week 5 | $3C_a + C_s$ |
| week 6 | $4C_a + C_s$ |
| week 7 | $C_e$ |
| week 8 | $C_e + 150$ |
| week 9 | $C_e + 300$ |
| week 10 | $C_e + 450$ |
| week 11 | $C_e + 300$ |
| week 12 | $C_e + 150$ |
| week 13 | $C_e$. |

8. In the method of claim 1, the additional step of providing nutrients daily during said diet interval in accordance with nutrient relationships which are given as:
Protein
   $W_p = 1.5 W_z$ grams
   50 grams $< W_p <$ 450 grams
   $C_p = 4 W_p$
   where $W_p$ is grams of said daily protein intake;
      $C_p$ is the calories in said daily protein intake; and
      $W_z$ is weight of the person in pounds prior to said diet interval;
Fat
   $C_f = 0.15 C_t$
   $W_f = C_f/9$
   30 grams $< W_f <$ 100 grams
   where $C_f$ is calories in a daily fat intake;
      $C_t$ is a total daily calorie intake of the person; and
      $W_f$ is grams of said daily fat intake;
Carbohydrate
   $C_c = C_t - C_f - C_p$
   $W_c = C_c/4$
   75 grams $< W_c <$ 450 grams
      where $W_c$ is grams of a daily carbohydrate; and
         $C_c$ is calories in said daily carbohydrate intake.

9. In the method of claim 8, the additional step of causing a video screen to provide a view of a menu of food that provides nutrients in accordance with said nutrient relationships.

10. In the method of claim 9 wherein said menu includes at least five meals with no more than two hours between meals.

11. In the method of claim 10 where the person desires to replace an undesired food on said menu, the additional steps of:
   highlighting a region of said screen where said undesired food appears on said menu;
   providing a substitution list of food items on said screen, said substitution list being arranged in descending order of nutritional preference;
   highlighting a food item on said substitution list;
   causing said highlighted item on said substitution list to appear on said menu in place of said undesired menu item, thereby modifying said menu; and
   adjusting the size of portions of said modified menu to cause said nutrients to be provided in accordance with said nutrient relationships.

12. In the method of claim 11, the additional step of providing a display on said screen a summary table of nutrients, vitamins and minerals provided by foods of said modified menu.

13. In the method of claim 12 where said summary list additionally provides an indication of whether there is a sufficiency or a toxicity of said vitamins and minerals.

14. In the method of claim 8, the additional step of including MCT oil as a nutrient that replaces some of said daily carbohydrate intake during said diet interval.

15. In the method of claim 14, the additional step of causing a video screen to provide a view of a menu of food that provides nutrients in accordance with said nutrient relationships.

16. In the method of claim 15 wherein said menu includes at least five meals with no more than two hours between meals.

17. In the method of claim 16 where the person desires to replace an undesired food on said menu, the additional steps of:
   highlighting a region of said screen where said undesired food appears on said menu;
   providing a substitution list of food items on said screen, said substitution list being arranged in descending order of nutritional preference;
   highlighting a food item on said substitution list;
   causing said highlighted item on said substitution list to appear on said menu in place of said undesired menu item, thereby modifying said menu; and
   adjusting the size of portions of said modified menu to cause said nutrients to be provided in accordance with said nutrient relationships.

18. In the method of claim 17, the additional step of providing a display on said screen a summary table of nutrients, vitamins and minerals provided by foods of said modified menu.

19. In the method of claim 17 where said summary table additionally provides an indication of whether there is a sufficiency or a toxicity of said vitamins and minerals.

* * * * *